(12) United States Patent
McClintock et al.

(10) Patent No.: US 9,348,977 B1
(45) Date of Patent: May 24, 2016

(54) DETECTING MALWARE IN CONTENT ITEMS

(75) Inventors: Jon A. McClintock, Seattle, WA (US); Eric J. Martin, Bainbridge Island, WA (US); Karl A. McCabe, Dublin (IE); Thibault Candebat, Dublin (IE); Adam J. Cecchetti, Seattle, WA (US); David Erdmann, Edmond, WA (US)

(73) Assignee: Amazon Technologies, Inc., Seattle, WA (US)

(*) Notice: Subject to any disclaimer, the term of this patent is extended or adjusted under 35 U.S.C. 154(b) by 1878 days.

(21) Appl. No.: 12/471,989

(22) Filed: May 26, 2009

(51) Int. Cl.
*G06F 21/00* (2013.01)

(52) U.S. Cl.
CPC ..................... *G06F 21/00* (2013.01)

(58) Field of Classification Search
CPC ....................................................... G06F 21/00
USPC ............................................................ 726/24
See application file for complete search history.

(56) References Cited

U.S. PATENT DOCUMENTS

| | | | |
|---|---|---|---|
| 7,613,918 B2 * | 11/2009 | Ben-Itzhak | 713/150 |
| 7,640,586 B1 * | 12/2009 | Johnson et al. | 726/24 |
| 7,797,421 B1 * | 9/2010 | Scofield et al. | 709/224 |
| 7,836,504 B2 * | 11/2010 | Ray et al. | 726/24 |
| 8,151,352 B1 * | 4/2012 | Novitchi | G06F 9/45508 717/138 |
| 8,201,246 B1 * | 6/2012 | Wu | G06F 21/554 703/23 |
| 8,353,031 B1 * | 1/2013 | Rajan | G06F 21/00 726/22 |
| 2006/0242709 A1 * | 10/2006 | Seinfeld et al. | 726/24 |
| 2007/0174915 A1 * | 7/2007 | Gribble | G06F 21/53 726/24 |
| 2007/0208751 A1 * | 9/2007 | Cowan et al. | 707/10 |
| 2008/0141376 A1 * | 6/2008 | Clausen et al. | 726/24 |
| 2008/0320583 A1 * | 12/2008 | Sharma et al. | 726/12 |
| 2009/0119778 A1 * | 5/2009 | Bhuyan | 726/25 |
| 2009/0222907 A1 * | 9/2009 | Guichard | 726/17 |
| 2009/0222923 A1 * | 9/2009 | Dixon | 726/24 |
| 2009/0241194 A1 * | 9/2009 | Thomas | G06F 21/53 726/24 |
| 2009/0282485 A1 * | 11/2009 | Bennett | 726/24 |
| 2009/0287571 A1 * | 11/2009 | Fujioka | 705/14.54 |
| 2010/0115621 A1 * | 5/2010 | Staniford | H04L 63/1416 726/25 |
| 2010/0132038 A1 * | 5/2010 | Zaitsev | G06F 21/552 726/22 |
| 2010/0192222 A1 * | 7/2010 | Stokes et al. | 726/22 |
| 2010/0192223 A1 * | 7/2010 | Ismael | G06F 21/566 726/22 |
| 2010/0251216 A1 * | 9/2010 | Low et al. | 717/126 |
| 2010/0251219 A1 * | 9/2010 | Peacock | G06F 11/3636 717/128 |
| 2010/0251363 A1 * | 9/2010 | Todorovic | G06F 21/53 726/22 |

OTHER PUBLICATIONS

Vasudevan et al., "Cobra: Fine-grained Analysis using Stealth Localized-executions", 2006.*
Tripathi et al., "A Test Bed for Information Security Skill Development with Virtual Training Environment".*
Adachi et al., "Malware Analysis System using Process-level Virtualization", 2009.*
O'Dea, "Trapping Worms in a Virtual Net", 2004.*
Singh, "Malware Analysis", 2008.*
Sidiroglou et al., "An Email Worm Vaccine Architecture", 2005.*

(Continued)

*Primary Examiner* — O. C. Vostal
(74) *Attorney, Agent, or Firm* — Thomas | Horstemeyer, LLP

(57) ABSTRACT

Disclosed are various systems, methods, and other embodiments directed to detection of malware in content items. To detect the malware, for example, one or more content items are identified in association with the rendering of a network page in a simulated environment. A plurality of tests are applied to the one or more content items to detect an existence of malware associated with the content items.

27 Claims, 6 Drawing Sheets

(56) References Cited

OTHER PUBLICATIONS

Cui, :Automating Malware Detection by Inferring Intent, 2006.*
Walters, "Product Review VMware Virtual Platform".*
Microsoft Computer Dictionary, "Web page", p. 564, 2002.*
Microsoft Computer Dictionary, "proxy server", p. 428, 2002.*

* cited by examiner

DETECTING MALWARE IN CONTENT ITEMS

CROSS REFERENCE TO RELATED APPLICATIONS

The following application is related to co-pending U.S. patent application entitled "DETECTING MALWARE IN CONTENT ITEMS" filed on even date herewith under Ser. No. 12/471,994, which is incorporated herein by reference in its entirety.

BACKGROUND

Website operators may often seek to generate revenue by including content external to their website into their web pages or other network content. Such external content may comprise advertisements or other types of content. Unfortunately, since such external content is typically downloaded by a client browser when a given web page is rendered on a client, it is possible that malicious components can be inserted into the external content without knowledge of the website operators. In such a case, the website operators may be deemed to have distributed malicious components in their web pages even though such distribution was done by the party who generated the external content.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the disclosure. Moreover, in the drawings, like reference numerals designate corresponding parts throughout the several views.

DETAILED DESCRIPTION

The following discussion describes systems and methods relating to the detection of malware in content items included within network pages such as web pages and other content according to various embodiments. For the sake of convenience, first a data communications network 100 is described, followed by a discussion of the operation of the various components of the data communications network 100 according to various embodiments.

Figure 1:
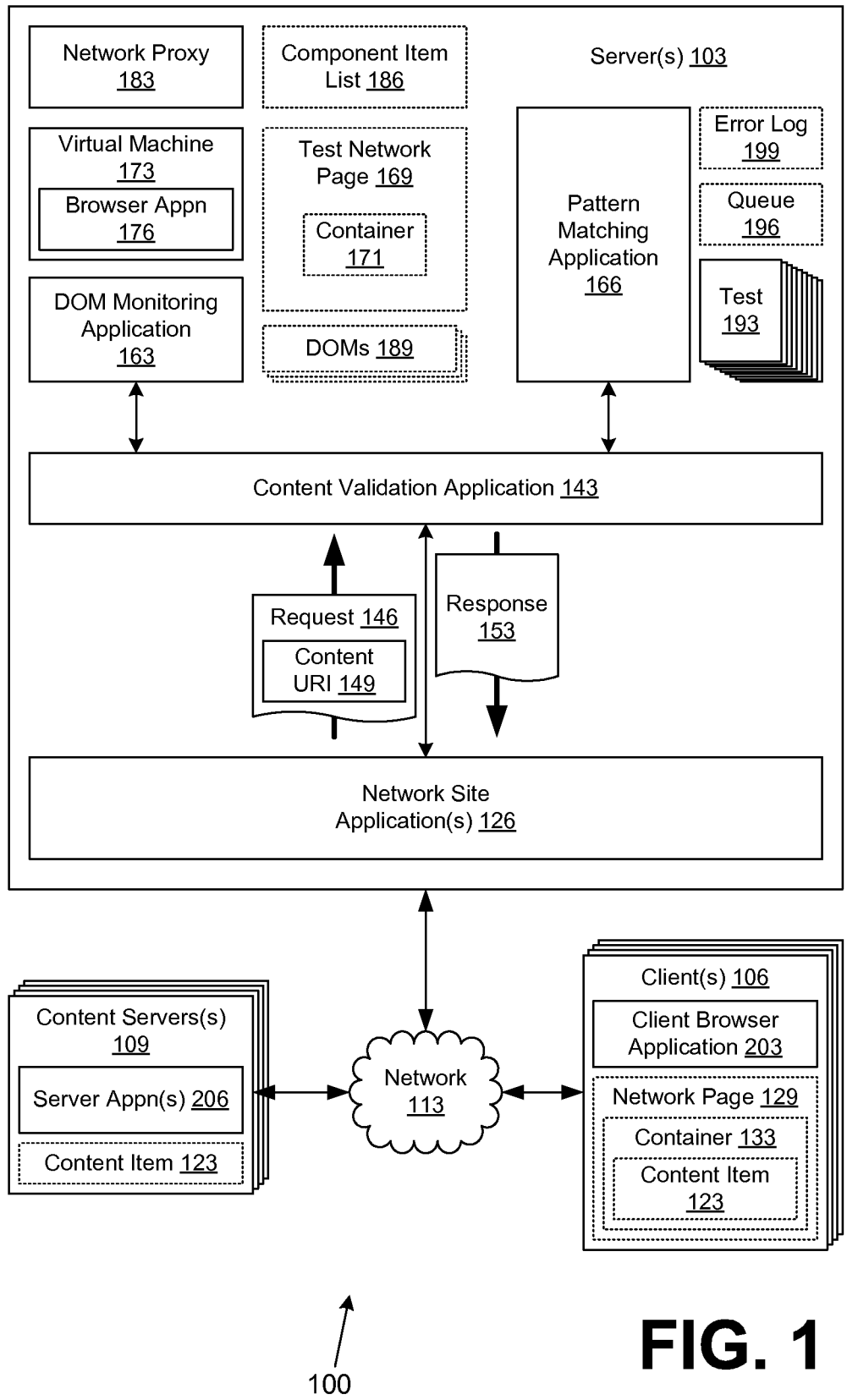
FIG. 1 is a drawing of one example of a data communications network according to an embodiment of the present disclosure.

With reference to FIG. 1, shown is an example of a data communications network 100 that includes one or more servers 103, one or more clients 106, and one or more content servers 109 that are coupled to a network 113. The network 113 may comprise, for example, the Internet, intranets, extranets, wide area networks (WANs), local area networks (LANs), wired networks, wireless networks, or other suitable networks, etc., or any combination of two or more such networks. For purposes of convenience, the one or more servers 103, one or more clients 106, and one or more content servers 109 are referred to herein in the singular. However, it is understood that in one embodiment, the server 103 and the content server 109 each may represent a plurality of servers, and the client 106 may represent a plurality of clients.

The server 103 is employed to execute various applications that provide for the detection of malware in content items 123 as will be described. As contemplated herein, the term "malware" refers to a computer contaminant such as software or other content that is designed to infiltrate or damage a computer system or the content rendered by a computer system without the consent of the operator or owner. In the following discussion, first the structural makeup of the various components of the data communications network 100 is described followed by a description of the operation of the same.

Each of the servers 103 and/or 109 may comprise, for example, a server computer or like system. The servers 103 and/or 109 may represent multiple servers arranged, for example, in one or more server banks or other arrangements. Such servers may be located in a single installation or may be dispersed among many different geographical locations.

Various applications and data are stored or executed in the server 103 according to various embodiments. The data associated with the operation of the various applications described below may be stored in one or more data stores as can be appreciated. The applications executed on the server 103 include various network site applications 126 that generate and serve up network pages 129 to clients 106. The network site applications 126 may be configured to provide a network presence of an entity such as an online merchant, an organization, or other entity. Such a network presence may comprise, for example, a website on the Internet or other type of network presence. The network pages 129 generated by the network site applications 126 may include one or more containers 133 into which content items 123 are placed. The content items 123 may be provided by the content servers 109. In this manner, according to one embodiment, the content items 123 are external to the network site provided by the network site applications 126. Such content items 123 may comprise advertisements or other items that are served up to clients 106 in association with the network site served up by the network site applications 126.

The applications implemented on the server 103 include a content validation application 143. Before a content item 123 is included in a container 133 of a network page 129 served up to a client 106, the network site applications 126 interact with a content validation application 143 to have content items 123 checked for malware. In doing so, the network site applications 126 generate a request 146 to scrutinize a content item 123 for malware that is sent to the content validation application 143. The request 146 includes a uniform resource identifier (URI) 149 or other network identifier that indicates where the respective content item 123 to be scrutinized for malware is located on the network 113. In one embodiment, the content item 123 is stored on the content server 109. Alternatively, the content item 123 may be stored in the server 103 or other location. Ultimately, the content validation application 143 generates a response 153 back to the requesting network site applications 126 that includes the results of the analysis of the respective content item 123.

The content validation application 143 interacts with various subordinate applications to scrutinize a content item 123. Such applications include a Document Object Model (DOM) monitoring application 163 and a pattern matching application 166. The DOM monitoring application 163 is configured to simulate an environment needed to render a test network page 169 that includes a container 171. To this end, the DOM monitoring application 163 is configured to initiate the creation of a virtual machine 173 and execute a browser application 176 on the virtual machine 173. The virtual machine 173 may be embodied in any suitable programming language such as JAVA or other language. The browser application 176 may comprise, for example, commercially available browsers such as INTERNET EXPLORER™ sold by Microsoft Corporation of Redmond, Wash., or MOZILLA FIREFOX™ which is promulgated by Mozilla Corporation of Mountain View, Calif., or other type of browser. Alternatively, the browser application 176 may comprise some other application besides commercially available browsers that implements appropriate functionality as described herein.

In addition, the DOM monitoring application 163 further generates a network proxy 183 through which all network traffic to and from the browser application 176 is routed. The network proxy 183 is configured to generate a component item list 186 of each of the resources accessed from the network 113 by the browser application 176 when a given content item 123 is rendered as part of the test network page 169 as will be described. During the course of the examination of a particular content item 123, the DOM monitoring application 163 may obtain various Document Object Models (DOMs) 189 that are scrutinized as will be described.

The pattern matching application 166 is configured to apply a plurality of tests 193 to content items 123 and their component items in order to identify malware in the form of various patterns or other forms. Each content item 123 and each component item that is part of, or is generated from, a content item 123 is placed in a queue 196. As various tests 193 are applied, the results of the tests 193 may be recorded in an error log 199 or other data structure.

The client 106 is representative of a plurality of client devices coupled to the network 113. The client 106 may comprise, for example, a processor-based system such as computer system. Such a computer system may be embodied in the form of a desktop computer, a laptop computer, a personal digital assistant, a cellular telephone, set-top box, music players, web pads, tablet computer systems, or other devices with like capability. The client 106 may include, for example various peripheral devices. In particular, the peripheral devices may include input devices such as, for example, a keyboard, keypad, touch pad, touch screen, microphone, scanner, mouse, joystick, or one or more push buttons, etc. The peripheral devices may also include display devices, indicator lights, speakers, etc. Specific display devices may be, for example, cathode ray tubes (CRTs), liquid crystal display (LCD) screens, gas plasma-based flat panel displays, LCD projectors, or other types of display devices, etc.

Executed within the client 106 are various applications including a client browser application 203. The client browser application 203 is configured to interact with the network site applications 126 according to an appropriate protocol such as the Internet Protocol Suite comprising Transmission Control Protocol/Internet Protocol (TCP/IP) or other protocols. To this end, the client browser application 203 may comprise, for example, a commercially available browser such as INTERNET EXPLORER® sold by Microsoft Corporation of Redmond, Wash., or MOZILLA FIREFOX® which is promulgated by Mozilla Corporation of Mountain View, Calif., or other type of browser. Alternatively, the client browser application 203 may comprise some other application with like capability. When executed in the client 106, the client browser application 203 renders the network page 129 for display, where the network page 129 that includes the content item 123 within the container 133 as described above.

The content server 109 includes various server applications 206 that serve up the content items 123 as requested. To this end, the server applications 206 may facilitate communication with the server 103 via an appropriate protocol such as TCP/IP as can be appreciated. In some cases, the component items 209 are served up in response to requests received that are generated by the rendering of a content item 123 or in response to other requests.

Next, a general discussion of the operation of the various components of the data communications network 100 is provided according to various embodiments. As described above, the network site applications 126 are configured to provide for the network presence, for example, of a merchant or other entity that wishes to maintain a presence online. Users may manipulate clients 106 to execute various browser applications 203 or other applications to access the many network pages 129 made available by the network site applications 126.

In various ones of the network pages 129, content items 123 may be included in containers 133, where the content items 123 are provided by third parties that store such content items 123 on a respective content server 109. To this end, the operator of the network site applications 126 may use various containers 133 of their network pages 129 to provide for advertising to generate revenue or for other purposes. Thus, the content items 123 may comprise, for example, an advertisement or other type of content that is inserted in the container 133 of respective network pages 129 in exchange for payment by the provider of the content item 123. The content item 123 may also comprise subject matter other than advertisements that is inserted into containers 133 of network pages 129 for other purposes.

The operator of the network site applications 126 may wish to check the content items 123 before they are inserted in containers 133 and served up as part of network pages 129 to clients 106 to ensure that such content items 123 do not contain malware or other problems. As contemplated herein, a "content item" 123 may comprise a complete content item 123, or any one of its component parts. Specifically, each component part of a content item 123 may be viewed as a separate content item 123 that is analyzed to identify malware or other problems in a manner as will be described below.

Accordingly, before the network site applications 126 incorporate a given content item 123 into network pages 129 that are served up to clients 106, the network site applications 126 generate a request 146 that includes the content uniform resource indicator (URI) 149 that is sent to the content validation application 143. The content URI 149 indicates the location of the content item 123 to be scrutinized on the network 113.

Upon receiving a request 146, the content validation application 143 proceeds to download the content item 123 from the respective content server 109 to be tested. Thereafter, the content item 123 is provided to the DOM monitoring application 163. The DOM monitoring application 163 proceeds to simulate an environment that is configured to render a test network page 169 having a container 171 for content placement. To this end, the DOM monitoring application 163 may cause a virtual machine 173 to be implemented in the server 103. Also, a browser application 176 is executed within the virtual machine 173. The browser application 176 is then employed to render the test network page 169.

In one embodiment, multiple versions of the test network page 169 are rendered. Specifically, in one instance, for example, a test network page 169 is rendered by the browser application 176 in which the container 171 is empty. In another instance, for example, the test network page 169 is rendered by the browser application 176 with the respective content item 123 inserted in the container 171. In one embodiment, DOMs 189 are obtained for each of the rendered test network pages 169 from the browser application 176. The DOMs 189 are then compared to identify whether the rendering of the content item 123 causes any changes to the test network page 169 outside of the container 171. To this end, a DOM 189 generated from a test network page 169 without the content item 123 inserted in the container 171 is compared with a corresponding DOM 189 generated from a test network page 169 having the content item 123 inserted in the container 171.

In addition, while the test network pages 169 are rendered, the DOM monitoring application 163 monitors activity by the browser application 176 for unauthorized action such as illegal operations that occur due to the rendering of the content item 123. For example, such illegal operations may involve illegally changing content of a network page 129 or detecting calls to components in the virtual machine 173 or the browser application 176 that are generally unnecessary to render the content item 123. Further, the illegal operations may also comprise operations that attempt to access data within the browser application 176 or the virtual machine 173 that is unrelated to the content item 123. The illegal operations may further comprise other operations.

According to one embodiment, the DOM monitoring application 163 detects the existence of malware in a content item 123 by implementing the rendering of the test network pages 169 in the environment consisting of the virtual machine 173 and the browser application 176, for example, to detect unauthorized action by the content item 123. Specifically, the DOM monitoring application 163 detects any attempt to tamper with the environment presented by the virtual machine 173 or the browser application 176 in a manner that is inconsistent with the rendering of the test network page 169 having the content item 123 inserted in the container 171.

In addition, the DOM monitoring application 163 is further configured to execute any executable portion of the content item 123 as rendered in the container 171 of a respective test network page 169. In doing so, the DOM monitoring application 163 may determine whether the executable portion of the content item 123 causes an alteration of any portion of the test network page 169 outside the container 171, or whether the executable portion causes an implementation of an illegal operation.

In addition, the DOM monitoring application 163 also executes a network proxy 183 in the server 103 through which all data traffic to and from the network 113 caused by the rendering of the content item 123 as part of the test network page 169 is routed. The network proxy 183 is configured to generate a component content list 186 that lists all component items that are accessed on the network 113 due to the rendering of the content item 123 as part of a test network page 169. These component items are further scrutinized as separate content items 123 to ensure that they do not include malware within themselves or are connected to malware in some other manner.

In one embodiment, such component items are placed within a container 171 as content items 123 and rendered as part of one or more test network pages 169. To this end, each function employed in monitoring the rendering of the content item 123 as described above is further employed with respect to a given component item treated as a separate content item 123.

Once the DOM monitoring application 163 has completed its functions with respect to a given content item 123, then the content validation application 143 requests the pattern matching application 166 to examine the original and component content items 123. Such component content items 123 may be included in the component content list 186 having been identified by the network proxy 183. To this end, all data traffic associated with the rendering of the original content item 123 has been directed through the network proxy 183 as described above. The network proxy 183 generates the list of each of the content items 123 accessed during the rendering of the original content item 123. According to one embodiment, the pattern matching application 166 is configured to detect the existence of malware associated with a content item 123 by applying tests 193 to the content item 123 as will be described. In this context, the content item 123 may comprise the original content item 123 rendered in a test network page 169 or component content items 123 accessed due to the rendering of the original content item 123 in the test network page 169.

Each of the tests 193 includes one or more conditions that are examined with respect to a content item 123. If each of the conditions is met for a given content item 123, an action is implemented with respect to the content item 123 by the pattern matching application 166. At least one of the tests 193 may also include an exclusion element that aborts the application of the test 193 to a given content item 123 when a certain pattern associated with the exclusion element is detected in the content item 123. This allows for exceptions to be applied with given tests 193.

Further, each test 193 further includes a string that describes the malware that is detected by the given test 193. The string may be output via a display or other type of output in response to the detection of the malware by a given one of the tests 193. This string may be configured to inform a user of the specific problem with the content item 123. The queue 196 is employed to track the content items 123 that are to be examined for the detection of the existence of malware. To this end, each of the content items 123 are included in the queue 196 for scrutiny by the pattern matching application 166 by applying the tests 193 thereto.

At least one action is associated with each test 193 as described above. To this end, the actions may be any one of a number of different types of actions that may be taken if the conditions associated with a test 193 are met. Such actions may comprise, for example, the action of rejecting a content item 123 for use with future generated network pages 129 as described above. An action may further include the act of logging an existence of a pattern in association with the content item 123. For example, the existence of a pattern that represents predefined malware associated with a content item 123 may be noted in the error log 199 associated with such content item 123.

In addition, a given action associated with a respective test 193 may be to apply a transform to the content item 123 that results in a modification of at least a portion of the content item 123. Such a transform may also be applied to a content item 123 itself. Such transforms may involve, for example, decompressing compressed content, transforming binary data into source representations, decoding base64 data into its original form, or normalizing the format of HTML code into a standard representation, etc.

In some cases, an action may be implemented that results in the generation of at least one additional content item 123 to be scrutinized. According to one embodiment, the pattern matching application 166 is configured to place the additional content item 123 into the queue 196 for separate analysis. The action that generates the additional content item 123 may comprise the application of a transform to a content item 123 as described above. To this end, in one embodiment, the additional content item 123 is placed in the queue 196 for separate analysis only when the additional content item 123 represents an altered version of a prior content item 123 to which the transform was applied.

In addition, other actions may be associated with respective tests 193 that are implemented based on the existence of respective conditions of such tests 193 as can be appreciated.

Figure 2A:
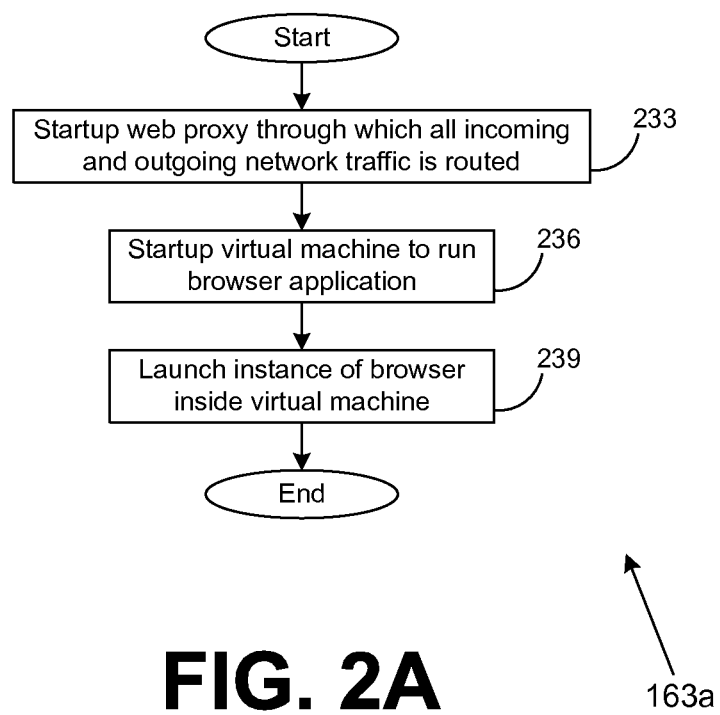
FIGS. 2A-C are drawings of a flowchart that provides one example of functionality associated with a Document Object Model (DOM) monitoring application implemented in a server in the data communications network of FIG. 1 according to an embodiment of the present disclosure.

With reference to FIG. 2A, shown is one example of a flowchart that shows a portion of the functionality of the DOM monitoring application 163 (FIG. 1), denoted herein as the DOM monitoring application 163a, according to an embodiment of the present disclosure. Alternatively, the flowchart of FIG. 2A may be viewed as depicting steps of an example of a method implemented in the server 103 (FIG. 1) according to various embodiments of the present disclosure.

The DOM monitoring application 163a facilitates the simulation of an environment for the rendering of test network pages 169 (FIG. 1) that may or may not include content items 123 (FIG. 1) inserted in the respective containers 171 (FIG. 1) of the test network pages 169 as described above.

Beginning with box 233, the DOM monitoring application 163a starts up a network proxy 183 (FIG. 1) such as a web proxy through which all incoming and outgoing network traffic to and from the network 113 (FIG. 1) is routed in association with the rendering of the content item 123 as part of the test network page 169. The network proxy 183 is configured to maintain a list of each network resource accessed by the content item 123 when rendered as described above. Such network resources may comprise further content items 123 as can be appreciated.

Thereafter, in box 236, the DOM monitoring application 163a launches an instance of a virtual machine 173 (FIG. 1) such as, for example, a VMWare or Xen virtual machine, to run a browser application 176 (FIG. 1) or its equivalent as can be appreciated. In box 239, the DOM monitoring application 163a launches an instance of a browser application 176 inside the virtual machine 173. Thereafter, the DOM monitoring application 163a ends as shown.

Figure 2B:
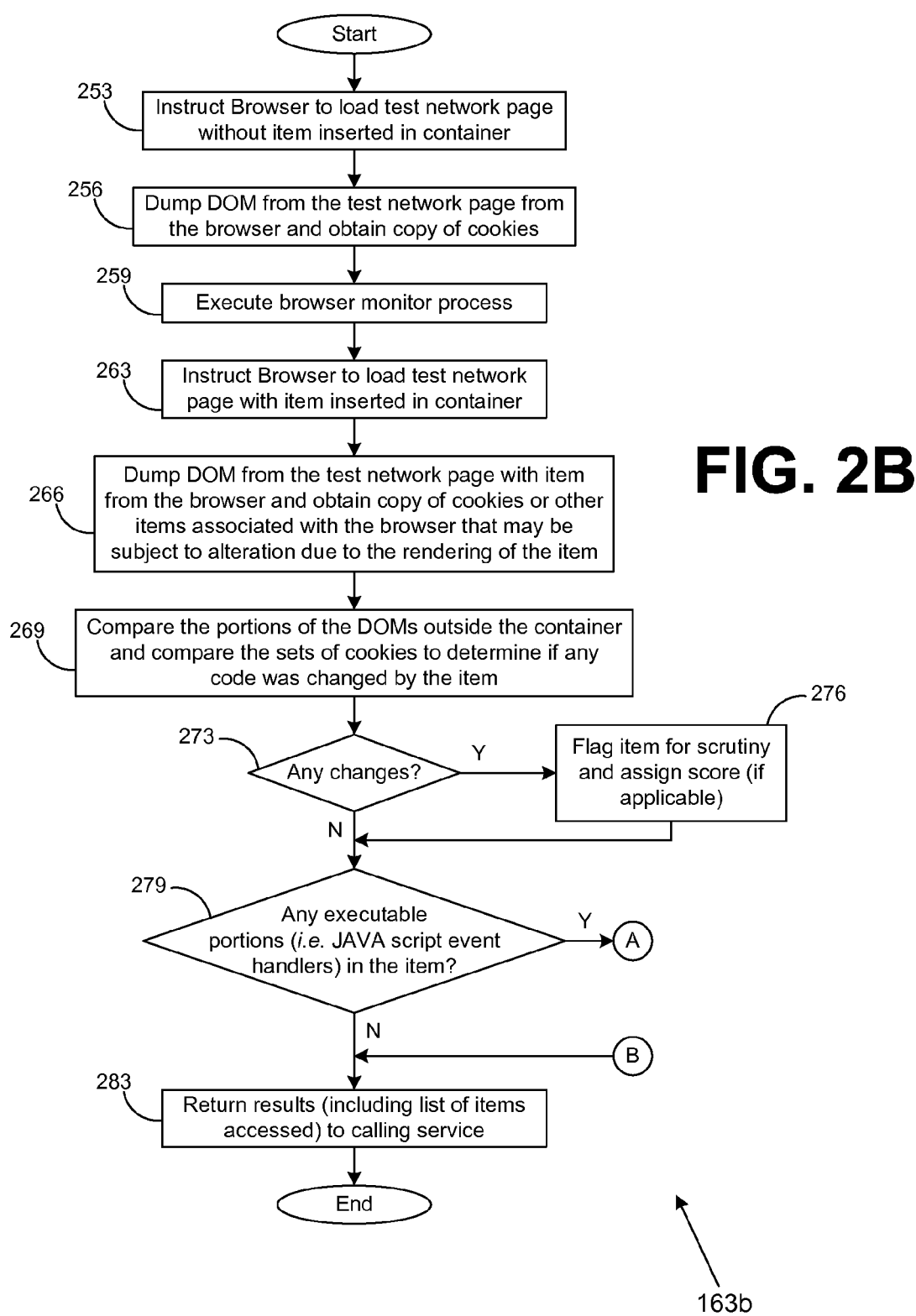
Figure 2C:
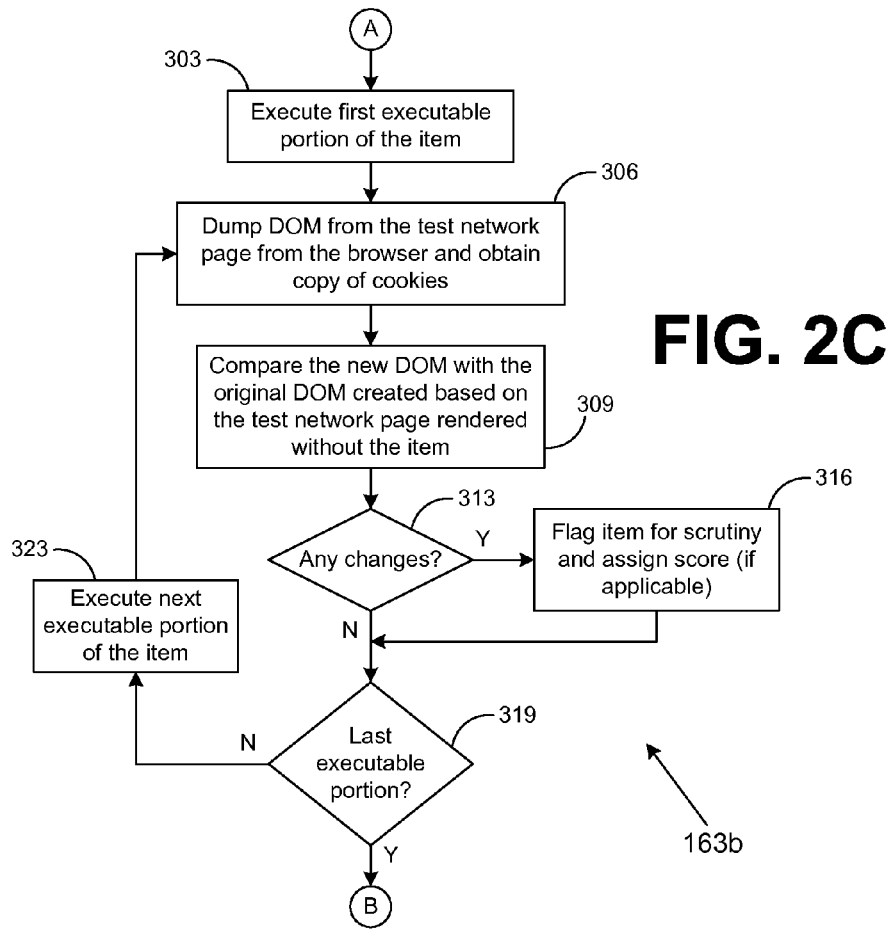

With reference to FIGS. 2B and 2C, shown is a flowchart that provides another example of a functionality of the DOM monitoring application 163, denoted herein as DOM monitoring application 163b, that is implemented in order to scrutinize a content item 123 (FIG. 1) for malware and other problems according to various embodiments of the present disclosure. Alternatively, the flowchart of FIGS. 2B and 2C may be viewed as depicting steps of an example of a method implemented in the server 103 (FIG. 1) according to various embodiments of the present disclosure.

To begin, in box 253, the DOM monitoring application 163b instructs the browser application 176 to load a test network page 169 without the content item 123 to be tested included in the container 171. Then, in box 256, the DOM 189 generated for the "empty" test network page 169 is dumped from the browser application 176. Also, copies of any cookies or other like data associated with the browser application 176 that may be subject to alteration due to the rendering of the content item 123 are obtained. Thereafter, in box 259, a browser monitoring process is executed to monitor the operation of the browser application 176 when rendering the test network page 169 with the respective content item 123 inserted in the container 171.

Next, the browser application 176 is instructed to load the test network page 169 with the content item 123 inserted in the container 171 of the test network page 169. In box 266, the DOM 189 from the test network page 169 that was rendered with the inserted content item 123 is dumped from the browser application 176. Also, copies of any cookies or any other items associated with the browser application 176 that may be subject to alteration due to the rendering of the content item 123 are obtained.

In box 269, the DOM monitoring application 163b proceeds to compare the portions of the respective DOMs 189 outside of the respective containers 171 to determine whether there has been any alteration in the second DOM 189 relative to the first DOM 189 due to the inclusion of the content item 123 in the second test network page 169. Also, the respective sets of cookies or other data are examined to determine if any portion of such cookies was changed due to the rendering of the content item 123.

In box 273, if any changes are identified, then the DOM monitoring application 163b proceeds to box 276 in which the item is flagged for scrutiny and assigned a score if applicable. To this end, a score may be assigned for the severity of the alteration detected. In order to flag a content item 123 for scrutiny, an entry may be noted in an appropriate error log 199. Thereafter, the DOM monitoring application 163b proceeds to box 279. Assuming that there were no changes detected in box 273, then the DOM monitoring application 163b also proceeds to box 279.

In box 279, the DOM monitoring application 163b identifies whether there are any executable portions in the content item 123 in question. Such executable portions may comprise, for example, Java Script, event handlers, or other types of executable portions as can be appreciated. If executable portions are noted, then the DOM monitoring application 163b proceeds to connector A as shown. Otherwise, the DOM monitoring application 163b progresses to box 283.

In box 283, the DOM monitoring application 163b returns a result to the content validation application 143 or other calling service that indicates all malware, if any, that was detected by the DOM monitoring application 163b. Thereafter, the DOM monitoring application 163b ends as shown.

With reference next to FIG. 2C, shown is a further portion of the DOM monitoring application 163b beginning at connector A according to an embodiment of the present disclosure. In box 303, the DOM monitoring application 163b executes the first executable portion detected in the content item 123. Then in box 306, the DOM 189 from the test network page 169 that included the content item 123 is dumped from the browser application 176. Also, copies of the cookies and any other data associated with the operation of the browser application 176 that are subject to change due to the rendering of a content item 123 are obtained.

Then, in box 309, the newly dumped DOM 189 is compared with the original DOM 189 generated based on the test network page 169 rendered without the content item 123. Also, the respective sets of cookies and other data may be examined to determine whether changes have occurred to these elements.

In box 313, if any changes are noted in portions of the newly dumped DOM 189 as compared to the original DOM 189, then the DOM monitoring application 163b proceeds to box 316 in which the content item 123 is flagged for further scrutiny and is assigned a score that indicates the severity of the changes identified. The content item 189 may be flagged by including an entry in an appropriate error log 199, or the content item 123 may be flagged in some other manner. Thereafter, the DOM monitoring application 163*b* proceeds to box 319.

Note that if no changes were identified in box 313, then the DOM monitoring application 163*b* progresses to box 319. In box 319, the DOM monitoring application 163*b* determines whether the last executable portion in the content item 123 has been executed. If so, then the DOM monitoring application 163*b* moves to connector B to box 283 (FIG. 2B). Otherwise, the DOM monitoring application 163*b* progresses to box 323 to execute the next executable portion of the content item 123. Thereafter, the DOM monitoring application 163*b* reverts back to box 306 described above.

Figure 3:
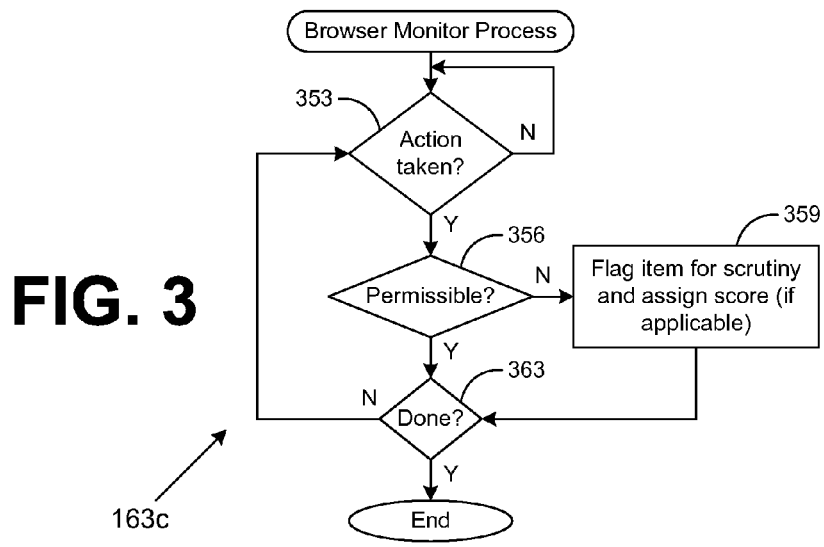
FIG. 3 is a drawing of a flowchart of one example of a monitoring process implemented in a server in the data communications network of FIG. 1 according to an embodiment of the present disclosure.

With respect to FIG. 3, shown is a flowchart depicting an additional portion of the DOM monitoring application 163, denoted herein as DOM monitoring application 163*c*, that is implemented in order to monitor the operation of the browser application 176 (FIG. 1) when rendering a test network page 169 (FIG. 1) to scrutinize a content item 123 (FIG. 1) for the implementation of illegal operations due to malware and other problems according to various embodiments of the present disclosure. Alternatively, the flowchart of FIG. 3 may be viewed as depicting steps of an example of a method implemented in the server 103 (FIG. 1) according to various embodiments of the present disclosure.

The DOM monitoring application 163*c* comprises a browser monitoring process that is executed in box 259 (FIG. 2B) as described above. The DOM monitoring application 163*c* monitors the operation of the browser application 176 to detect the implementation of illegal operations. Specifically, such operations may be those that are deemed unnecessary for the rendering of a content item 123 given the nature of the content item 123. For example, where the content item 123 comprises an advertisement, it should be unnecessary to perform various actions beyond those needed to render the advertisement for viewing by a user such as accessing information in cookies or making unnecessary system calls to components associated with the virtual machine 173 (FIG. 1), etc.

To begin, in box 353, the DOM monitoring application 163*c* determines whether any potentially inappropriate action is taken by the browser application 176. Such actions need to be scrutinized to determine whether they are predefined illegal operations as mentioned above. Assuming that some sort of action is taken in box 353, then in box 356, the DOM monitoring application 163*c* determines whether such action is permissible or whether such action comprises an illegal operation. This may be done, for example, by consulting a list of operations deemed legal to determine whether the action matches one of the listed legal operations. If the action is not included in the list, then it may be deemed illegal. Assuming that the action is deemed impermissible or illegal in box 356, then the DOM monitoring application 163*c* progresses to box 359 in which the content item is flagged for further scrutiny and a score is associated with the content item 123 (if applicable) that indicates the severity of the illegal action taken. Thereafter, the DOM monitoring application 163*c* proceeds to box 363. Assuming that the action taken was deemed permissible or legal in box 356, then the DOM monitoring application 163*c* progresses to box 363.

In box 363, the DOM monitoring application 163*c* determines whether the action of the browser 176 in rendering the content item 123 has completed, such that no further impermissible actions should be undertaken. If so, then the DOM monitoring application 163*c* ends. Otherwise, the DOM monitoring application 163*c* reverts back to box 363 to continue monitoring the browser application 176 for further actions to be scrutinized.

The various types of actions taken that may be deemed illegal operations may comprise, for example, making system calls outside the DOM tree associated with the rendering of the content item 123, making system calls to the virtual machine 176 that are deemed impermissible, accessing files associated with the operation of the browser application 176 or the virtual machine 173 that are beyond the scope of the rendering of the content item 123, or other actions.

Figure 4:
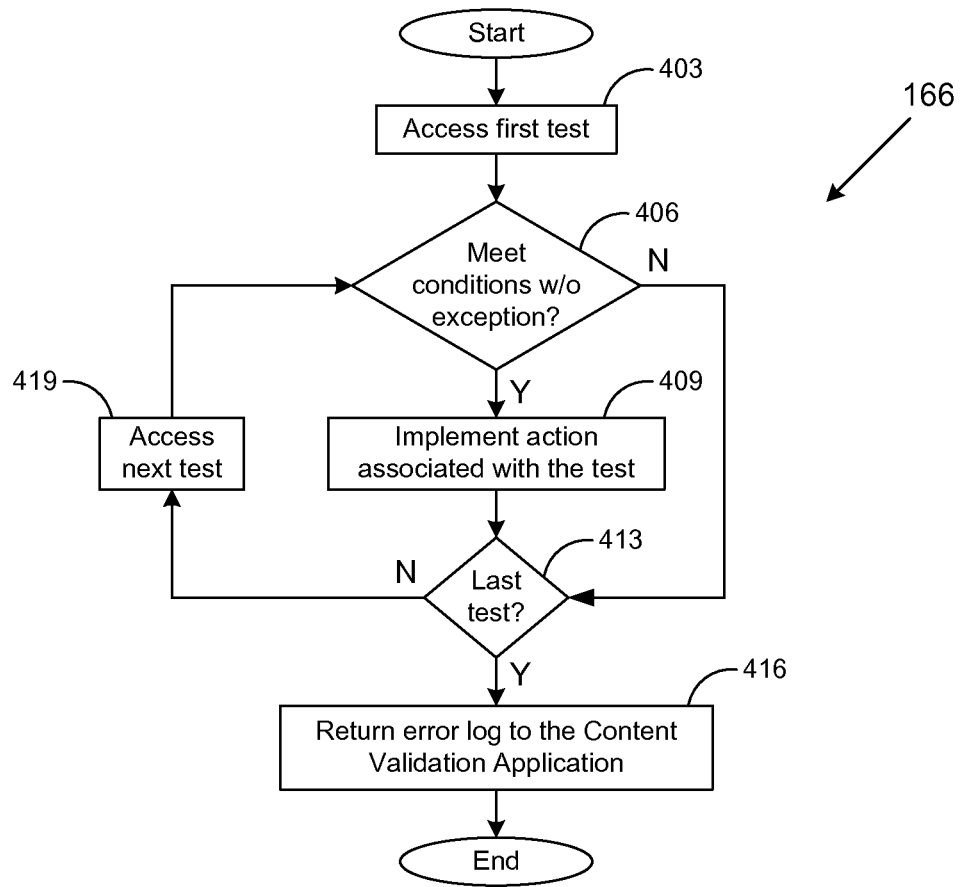
FIG. 4 is a drawing of a flowchart that provides one example of functionality of a pattern matching application implemented in a server in the data communications network of FIG. 1 according to an embodiment of the present disclosure.

With reference to FIG. 4, shown is a flowchart depicting one example of functionality of the pattern matching application 166 implemented in order to further scrutinize a content item 123 (FIG. 1) for malware and other problems according to various embodiments of the present disclosure. Alternatively, the flowchart of FIG. 4 may be viewed as depicting steps of an example of a method implemented in the server 103 (FIG. 1) according to various embodiments of the present disclosure.

The example functionality of the pattern matching application 166 represented by the flowchart of FIG. 4 is implemented for each content item 123 to be tested. Beginning in box 403, a first one of the tests 193 (FIG. 1) is accessed to be applied to the respective content item 123 under scrutiny. Thereafter, in box 406, the pattern matching application 166 determines whether the conditions of the respective test 193 are met without exception based upon the content item 123. If so, then the pattern matching application 166 proceeds to box 409 to implement the action associated with the test 193 with respect to the content item 123. Thereafter, the pattern matching application 166 progresses to box 413. If the conditions are not met or if an exception is applicable in box 406, then the pattern matching application 166 progresses directly to box 413.

In box 413, it is determined whether the last test 193 of the battery of tests 193 stored in the server 103 has been applied to the respective content item 123. If so, then the pattern matching application 166 progresses to box 416 in which the error log 199 (FIG. 1) is returned to the content validation application 143 indicating any errors noted. Thereafter, the pattern matching application 166 ends. However, assuming that the last of the tests 193 has not been applied in box 413, then the pattern matching application 166 progresses to box 419 to access the next test 193 to be applied to the respective content item 123.

The actions that may be taken in box 409 comprise those actions described above including, for example, rejecting a content item 123 for use with future generated network pages 129 (FIG. 1), logging an existence of a pattern in the error log 199 (FIG. 1) in association with the content item 123, or indicating that the content item 123 is suspect, requiring further manual scrutiny, etc. Additionally, the action taken in box 409 may comprise applying a transform to the content item 123 that results in a modification of at least a portion of the content item 123 or that provides some other result.

Figure 5:
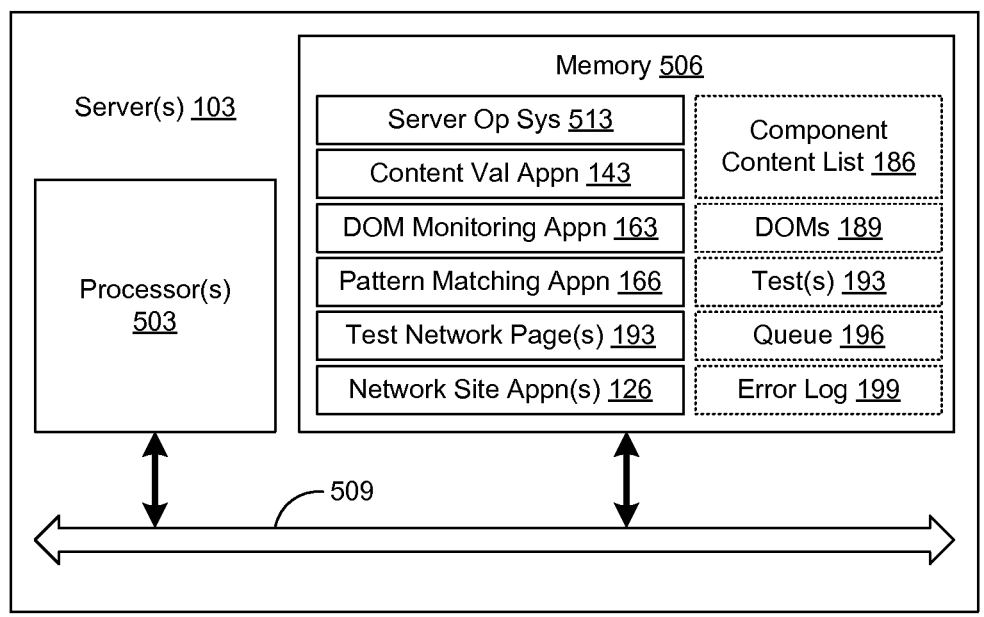
FIG. 5 is a schematic block diagram that provides on example of a server in the data communications network of FIG. 1 according to an embodiment of the present disclosure.

Referring next to FIG. 5, shown is a schematic block diagram of one example of the server 103 according to an embodiment of the present disclosure. The server 103 includes at least one processor circuit, for example, having a processor 503 and a memory 506, both of which are coupled to a local interface 509. To this end, the server 103 may comprise, for example, a server computer or like device. The local interface 509 may comprise, for example, a data bus with an accompanying address/control bus or other bus structure as can be appreciated.

Stored in the memory 506 are both data and several components and/or applications that are executable by the processor 503. In particular, stored in the memory 506 and executable by the processor 503 are a server operating system 513, the content validation application 143, the DOM monitoring application 163, the pattern matching application 166, the test network page(s) 193, the queue 196, and the network site application(s) 126, and potentially other applications.

Also, stored in the memory 506 are various data components that may be stored in a data store such as a database, etc., so as to be accessible to the processor 503. Such data components may comprise, for example, the component content list 186, the DOMs 189, the tests 193, the error log 199, and other data components. It is understood that there may be other applications that are stored in the memory 506 and are executable by the processor 503 as can be appreciated. Also, other data may be stored in the memory 506 and accessed by the processors 503.

A number of software components are stored in the memory 506 and are executable or executed by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

In addition, the processor 503 may represent multiple processors and the memory 506 may represent multiple memories that operate in parallel. In such a case, the local interface 509 may be an appropriate network that facilitates communication between any two of the multiple processors, between any processor and any one of the memories, or between any two of the memories etc. The local interface 509 may comprise additional systems designed to coordinate this communication, including, for example, performing load balancing. The processor 503 may be of electrical or of some other available construction.

The various applications described above may be implemented using any one or more of a number of programming languages such as, for example, C, C++, C#, Visual Basic, VBScript, Java, JavaScript, Perl, Ruby, Python, Flash, or other programming languages.

Although the various applications described above may be embodied in software or code executed by general purpose hardware, as an alternative the same may also be embodied in dedicated hardware or a combination of software/general purpose hardware and dedicated hardware. If embodied in dedicated hardware, the same can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those skilled in the art and, consequently, are not described in detail herein.

The block diagrams and/or flowcharts of FIGS. 2A-C, 3, and 4 show the functionality and operation of an implementation of the various applications described above. If embodied in software, each of the various blocks described may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 2A-C, 3, and 4 show a specific order of execution, it is understood that the order of execution may differ from that which is depicted. For example, the order of execution of two or more blocks may be scrambled relative to the order shown. Also, two or more blocks shown in succession in FIGS. 2A-C, 3, and/or 4 may be executed concurrently or with partial concurrence. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, where the various applications described herein comprise software or code, each can be embodied in any computer-readable medium for use by or in connection with an instruction execution system such as, for example, a processor in a computer system or other system. In this sense, the applications may comprise, for example, statements including instructions and declarations that can be fetched from the computer-readable medium and executed by the instruction execution system. In the context of the present disclosure, a "computer-readable medium" can be any medium that can contain, store, or maintain logic or code for use by or in connection with the instruction execution system. The computer readable medium can comprise any one of many physical media such as, for example, electronic, magnetic, optical, electromagnetic, infrared, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A method, comprising:
   inserting an original content item in a container in a network page to be rendered;
   rendering the network page in a simulated environment in a virtual machine created in a computing device;
   generating a list of at least one content item based upon the rendering of the network page in the simulated environment, the at least one content item including the original content item; and
   applying a plurality of tests to the at least one content item to detect an existence of malware associated with the at least one content item, wherein for each of the tests, the method further comprises:
      determining whether a plurality of conditions associated with at least one of the plurality of tests are met by the at least one content item; and
      implementing an action associated with the at least one of the plurality of tests when it is determined that the at least one content item meets the conditions associated with the at least one of the plurality of tests, the action comprising one of:
         rejecting the content item for use with future generated network pages;
         logging an existence of a pattern in association with the content item; or
         applying a transform to the content item that results in a modification of at least a portion of the content item.

2. The method of claim 1, further comprising placing the at least one content item in a queue to be examined to detect the existence of the malware associated therewith.

3. The method of claim 2, wherein the implementation of the action causes the generation of an additional item, the method further comprising placing the additional item in the queue for separate analysis.

4. A system, comprising:
   an environment simulated in a virtual machine created in a computing device configured to identify at least one content item associated with a rendering of at least one network page; and
   an application that detects an existence of malware associated with the at least one content item by applying a plurality of tests to the at least one content item.

5. The system of claim 4, wherein:
   the at least one content item further comprises an original content item rendered as a portion of the network page, the original content item being inserted into a container of the network page; and
   the environment further comprises a proxy server implemented in the computing device through which all data traffic associated with the original content item is directed, the proxy server identifying the at least one content item when the at least one content item is accessed from a network.

6. The system of claim 5, wherein each of the tests further comprises:
   a plurality of conditions that are examined with respect to the at least one content item; and
   an action that is implemented if each of the conditions is met with respect to the at least one content item.

7. The system of claim 6, wherein the action further comprises rejecting the at least one content item for use with future generated network pages.

8. The system of claim 6, wherein the action further comprises logging an existence of a pattern in association with the at least one content item.

9. The system of claim 6, wherein the action further comprises applying a transform to the at least one content item that results in a modification of at least a portion of the at least one content item.

10. The system of claim 4, wherein at least one of the tests further comprises an exclusion element that aborts an application of the at least one of the tests to the at least one content item when a pattern associated with the exclusion element is detected in the at least one content item.

11. The system of claim 4, wherein each of the tests further comprises a string that describes the malware detected by at least one of the tests, where the string is output in response to the detection of the malware by the at least one of the tests.

12. The system of claim 4, wherein the application includes a queue in which the at least one content item is listed to be examined to detect the existence of the malware associated therewith.

13. The system of claim 12, wherein at least one of the tests comprises:
   a plurality of conditions that are examined with respect to the at least one content item;
   an action that is implemented if each of the conditions is met with respect to the at least one content item;
   the action generating at least one additional item; and
   wherein the application is configured to place the at least one additional item in the queue for separate analysis.

14. The system of claim 13, wherein the action generates the at least one additional item by applying a transform to the at least one content item.

15. The system of claim 14, wherein the at least one additional item is placed in the queue for separate analysis only when the at least one additional item is altered with respect to the at least one content item.

16. A method, comprising:
   identifying at least one content item in association with the rendering of a network page in a simulated environment in a virtual machine; and
   applying a plurality of tests to the at least one content item to detect an existence of malware associated with the at least one content item.

17. The method of claim 16, further comprising inserting an original content item in a container in the network page before rendering the network page in the simulated environment, where the at least one content item includes the original content item.

18. The method of claim 17, wherein for each of the tests, the method further comprises:
   determining whether a plurality of conditions associated with at least one of the tests are met by the at least one content item; and
   implementing an action associated with the at least one of the tests when it is determined that the at least one content item meets the conditions associated with the at least one of the tests.

19. The method of claim 18, wherein implementing the action further comprises rejecting the content item for use with future generated network pages.

20. The method of claim 18, wherein implementing the action further comprises logging an existence of a pattern in association with the content item.

21. The method of claim 18, wherein implementing the action further comprises applying a transform to the at least one content item that results in a modification of at least a portion of the at least one content item.

22. The method of claim 16, further comprising associating an exclusion element with at least one of the tests that aborts an application of the at least one of the tests to the at least one content item when a pattern associated with the exclusion element is detected in the at least one content item.

23. The method of claim 18, further comprising placing the at least one content item in a queue to be examined to detect the existence of the malware associated therewith.

24. The method of claim 23, wherein the implementation of the action causes the generation of an additional item, the method further comprising placing the additional item in the queue for separate analysis.

25. The method of claim 24, wherein the implementation of the action further comprises applying a transform to the at least one content item.

26. The method of claim 25, wherein the at least one additional item is placed in the queue for separate analysis only when the at least one additional item is altered with respect to the at least one content item.

27. A system, comprising:
   an environment simulated in a computing device configured to identify at least one content item associated with a rendering of at least one network page; and
   an application that detects an existence of malware associated with the at least one content item by applying a plurality of tests to the at least one content item, wherein the at least one content item further comprises an original content item rendered as a portion of the network page, the original content item being inserted into a container of the network page, and wherein the environment further comprises a proxy server implemented in the computing device through which all data traffic associated with the original content item is directed, the proxy server identifying the at least one content item when the at least one content item is accessed from a network.

* * * * *